(12) United States Patent
Okahashi et al.

(10) Patent No.: US 6,423,821 B1
(45) Date of Patent: Jul. 23, 2002

(54) METHOD FOR PRODUCING POLY(P-T-BUTOXYSTYRENE)

(75) Inventors: Takanori Okahashi, Hyogo; Hiroharu Takeshima, Osaka; Seigo Ito, Oita, all of (JP)

(73) Assignee: Sumitomo Chemical Company, Ltd., Osaka (JP)

( * ) Notice: Subject to any disclaimer, the term of this patent is extended or adjusted under 35 U.S.C. 154(b) by 0 days.

(21) Appl. No.: 09/935,046

(22) Filed: Aug. 23, 2001

(30) Foreign Application Priority Data

Aug. 25, 2000 (JP) .......................................... 2000-255117

(51) Int. Cl.$^7$ .................................................. C08F 6/06
(52) U.S. Cl. ...................... 528/499; 528/491; 528/493; 528/494; 528/496; 526/313
(58) Field of Search ........................... 526/313; 528/491, 528/496, 499, 493, 494

(56) References Cited

U.S. PATENT DOCUMENTS 6,218,485 B1 * 4/2001 Muramoto et al. ..... 526/313 X
6,291,604 B1 * 9/2001 Takeshima ............... 526/313 X

FOREIGN PATENT DOCUMENTS

| JP | 6336602 | 7/1988 |
| JP | 3277608 | 12/1991 |
| JP | 2746053 | 2/1998 |

* cited by examiner

Primary Examiner—Fred Teskin
(74) Attorney, Agent, or Firm—Stevens, Davis, Miller & Mosher, L.L.P.

(57) ABSTRACT

A method for producing poly(p-t-butoxystyrene), which comprises polymerizing p-t-butoxystyrene in a hydrocarbon type reaction solvent in the presence of a polymerization initiator, and, after termination of the polymerization reaction, conducting a separation of the hydrocarbon type reaction solvent layer containing poly(p-t-butoxystyrene) and the water layer in the presence of 1–50 parts by weight of a polar solvent per 100 parts by weight of the hydrocarbon type reaction solvent layer, wherein the separation efficiency, after termination of the polymerization reaction, of the hydrocarbon type reaction solvent layer containing poly(p-t-butoxystyrene) and the water or acidic water layer conspicuously improves.

1 Claim, No Drawings

METHOD FOR PRODUCING POLY(P-T-BUTOXYSTYRENE)

BACKGROUND OF THE INVENTION

The present invention relates to a method for producing poly(p-t-butoxystyrene) by a polymerization of p-t-butoxystyrene in a hydrocarbon type reaction solvent in the presence of a polymerization initiator, In which, after termination of the polymerization reaction, separation of the hydrocarbon type reaction solvent layer containing poly(p-t-butoxystyrene) and the water layer is improved.

Poly(p-t-butoxystyrene) has been used as a resin component in a photoresist composition, and produced by a polymerization of p-t-butoxystyrene in a hydrocarbon type reaction solvent in the presence of a polymerization initiator, the polymerization reaction being terminated by dropwise adding or pouring the reaction solution to water.

In the production, decomposed products of the polymerization initiator and the like need to be removed. A method for removing the decomposed products and the like is proposed which comprising a wash with water or an acidic water containing an organic acid such as oxalic acid, acetic acid or paratoluenesulfonic acid or inorganic acid such as hydrochloric acid or sulfuric acid. However, the method requires a separation of the hydrocarbon type reaction solvent layer and the water layer, and the separation takes a long time due to interior separation efficiency. Further, since water is taken in the hydrocarbon type reaction solvent layer, the method causes problems, such as that an operation for removing water, for example concentration, is required in the latter step, and that poly(p-t-butoxystyrene) having the intended quality cannot be obtained due to the contamination of the decomposed products and the like dissolving in the water.

The inventors of the present invention have conducted extensive and intensive studies for solving the above problems. As a result, they have found that the separation efficiency improves by a specific amount of a polar solvent existing at the separation, after termination of the polymerization reaction, of the hydrocarbon type reaction solvent layer containing poly(p-t-butoxystyrene) and the water layer. The present invention was thus completed.

SUMMARY OF THE INVENTION

The present invention provides a method for producing poly(p-t-butoxystyrene), which comprises polymerizing p-t-butoxystyrene in a hydrocarbon type reaction solvent in the presence of a polymerization initiator, and, after termination of the polymerization reaction, conducting a separation of the hydrocarbon type reaction solvent layer containing poly(p-t-butoxystyrene) and the water layer in the presence of 1–50 parts by weight of a polar solvent per 100 parts by weight of the hydrocarbon type reaction solvent layer.

EMBODIMENT OF THE INVENTION

In the present invention, a polar solvent exists at the separation of the hydrocarbon type reaction solvent layer containing poly(p-t-butoxystyrene) and the water layer.

Examples of the polar solvent include lower aliphatic alcohols such as methanol and ethanol, ethers such as ethyleneglycoldimethylether and ethyleneglycoldiethylether, and ketones such as 2-methyl-3-pentanon and 2-methyl-4-pentanon. Among them, lower aliphatic alcohols are preferred and methanol is particularly preferred.

In the present invention, amount of the polar solvent is 1–50 parts by weight per 100 parts by weight of the hydrocarbon type reaction solvent layer. Preferably, the amount is 2–20 parts by weight per 100 parts by weight of the hydrocarbon type reaction solvent layer.

If the amount of the polar solvent exceeds 50 parts by weight, yield of the poly(p-t-butoxystyrene) lowers. On the other hand, if the amount of the polar solvent is less than 1 part by weight, the separation efficiency does not improve.

When the amount of the polar solvent is within the above range, generation of an emulsion is suppressed at the surface between the water layer and the hydrocarbon type reaction solvent layer containing poly(p-t-butoxystyrene) after termination of the polymerization reaction. Particularly, generation of an emulsion is efficiently suppressed at separation of the hydrocarbon type reaction solvent layer after washed with water or acidic water The polar solvent may exist in water or acidic water to which the polymerization reaction mixture is poured to terminate the polymerization reaction. However, it is more preferred that the polymerization reaction mixture poured in water or acidic water is separated to obtain a hydrocarbon type reaction solvent layer, and then the hydrocarbon type reaction solvent layer is washed in the existence of a polar solvent.

Examples of the hydrocarbon type reaction solvent include aromatic hydrocarbons such as benzene, toluene and xylene, aliphatic hydrocarbons such as hexane, heptane, cyclohexane and methylcyclohexane, ethers such as tetrahydrofuran, 1,4-dioxane and ethyleneglycoldimethylether, and mixtures of two or more of them.

Examples of the polymerization initiator include alkyl lithium such as n-butyl lithium and sec-butyl lithium, and organic metal compounds such as lithium naphthalene. The polymerization initiator is used preferably in an amount of about $10^{-5}$–$10^{-3}$ mol. per 1 g of p-t-butoxystyrene.

The polymerization reaction is usually conducted in an atmosphere of an inert gas such as argon or nitrogen, at a temperature of –50–0° C., for 10 minutes–20 hours. The polymerization reaction is usually terminated by dropwise adding or pouring the polymerization reaction mixture in water or an alcohol.

The following examples further illustrate the present invention, but do not limit the scope thereof.

EXAMPLE 1

Under an nitrogen atmosphere, 790 ml of hexane and 6.2 mmol of sec-butyllithium are charged in a flask, and cooled to –20° C. Then, a mixed solvent of 118 g of p-t-butoxystyrene and 8 ml of ethyleneglycoldimethylether was added dropwise thereto to conduct the polymerization reaction. After about 650 g of the resultant reaction mass was dropwise added to water, a separation was conducted. After the separation, 33 g of methanol and water were added to the solvent layer thus obtained, and stirred. Then, a separation was conducted to obtain a solvent layer. No generation of emulsion was observed and water content in the solvent layer was 0.1%.

COMPARATIVE EXAMPLE 1

Under an nitrogen atmosphere, 330 ml of hexane and 2.7 mmol of sec-butyllithium are charged in a flask, and cooled to –20° C. Then, a mixed solvent of 49 g of p-t-butoxystyrene and 3 ml of ethyleneglycoldimethylether was added dropwise thereto to conduct the polymerization reaction. After 270 g of the resultant reaction mass was dropwise added to water, a separation was conducted. After the separation, water was added to the solvent layer thus obtained, and stirred. Then. a separation was conducted but whole of the solvent layer became emulsion and water content in the solvent layer was 3.2%.

EXAMPLE 2

To 100 parts by weight of the solvent layer obtained in Compartive example 1, 5 parts by weight of 2-methyl-4-pentanone was added, and stirred. Then, a separation was conducted. No generation of emulsion was observed and water content in the solvent layer thus obtained was 0.2%.

According to the method of the present invention, the separation efficiency, after termination of the polymerization reaction of the hydrocarbon type reaction solvent layer containing poly(p-t-butoxystyrene) and the water or acidic water layer conspicuously improves.

What is claimed is:

1. A method for producing poly(p-t-butoxystyrene), comprising:

polymerizing p-t-butoxystyrene in a hydrocarbon reaction solvent in the presence of a polymerization initiator, adding water, to produce a water layer and a hydrocarbon reaction solvent layer containing poly(p-t-butoxystyrene), and thereafter, separating the hydrocarbon reaction solvent layer containing poly(p-t-butoxystyrene) from the water layer in the presence of 1–50 parts by weight of a polar solvent per 100 parts by weight of the hydrocarbon reaction solvent layer.

* * * * *